US012696039B2

(12) United States Patent
Chen et al.

(10) Patent No.: US 12,696,039 B2
(45) Date of Patent: Jul. 28, 2026

(54) OUTER EAR STRUCTURE AND OUTER EAR MODULE OF RECORDING SYSTEM

(71) Applicant: Merry Electronics(Shenzhen) Co., Ltd., ShenZhen (CN)

(72) Inventors: Hung-Wei Chen, Taichung (TW); Chun-Hung Chang, Taichung (TW); Po Hsun Sung, Taichung (TW); Yi Lin Hsieh, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 148 days.

(21) Appl. No.: 18/773,609

(22) Filed: Jul. 16, 2024

(65) Prior Publication Data

US 2025/0358575 A1 Nov. 20, 2025

(30) Foreign Application Priority Data

May 15, 2024 (TW) ................................ 113117851

(51) Int. Cl.
*H04R 25/00* (2006.01)

(52) U.S. Cl.
CPC ........... *H04R 25/60* (2013.01); *H04R 25/456* (2013.01)

(58) Field of Classification Search
CPC .... H04R 25/60; H04R 25/456; H04R 1/1016; H04R 1/1075; H04R 2460/11
See application file for complete search history.

(56) References Cited

U.S. PATENT DOCUMENTS

2015/0110320 A1* 4/2015 Liu .......................... H04R 1/44 381/322
2018/0160214 A1* 6/2018 Zhao .................... H04R 1/1041

* cited by examiner

*Primary Examiner* — Sunita Joshi
(74) *Attorney, Agent, or Firm* — JCIPRNET

(57) ABSTRACT

An outer ear structure of recording system includes a base, a first component and a second component. The base includes a first through hole extending along a first axis. The first component is disposed on the base and includes a second through hole corresponding to the first through hole and a recessed area surrounding the second through hole. The second component is disposed on the first component and is offset from the second through hole. An area of the second component is smaller than an area of the first component. The second component includes an inwardly curved side wall facing the first axis.

12 Claims, 7 Drawing Sheets

OUTER EAR STRUCTURE AND OUTER EAR MODULE OF RECORDING SYSTEM

CROSS-REFERENCE TO RELATED APPLICATION

This application claims the priority benefit of Taiwan application serial no. 113117851, filed on May 15, 2024. The entirety of the above-mentioned patent application is hereby incorporated by reference herein and made a portion of this specification.

BACKGROUND

Technical Field

The disclosure relates to an outer ear structure and an outer ear module, and in particular relates to an outer ear structure and an outer ear module of a recording system.

Description of Related Art

With the technological development of products, the methods of acoustic experience have also evolved. In recent years, spatial audio has been integrated into many consumer electronic products. In order to create a more immersive audio experience, the impact of binaural structures on acoustic characteristics and the consideration of head-related transfer functions are indispensable in the design of recording systems.

In order to have acoustic characteristics similar to those of real human ears, existing binaural recording systems mostly retain the auricle structure of the real human ear. Due to its complex curved surfaces and the need to closely replicate the real tactile sensation, silicone material is generally used for molding, resulting in increased manufacturing costs. How to simplify the outer ear structure to reduce manufacturing complexity and production costs, while maintaining a similar sound pressure level curve is the direction of research in this field.

SUMMARY

An outer ear structure and an outer ear module of a recording system, which have a relatively simple structure and have acoustic characteristics similar to those of the human ear, are provided in the disclosure.

An outer ear structure of a recording system of the disclosure includes a base, a first component, and a second component. The base includes a first through hole extending along a first axis. The first component is disposed on the base and includes a second through hole corresponding to the first through hole and a recessed area surrounding the second through hole. The second component is disposed on the first component and is offset from the second through hole. An area of the second component is smaller than an area of the first component. The second component includes an inwardly curved side wall facing the first axis.

In an embodiment of the disclosure, a thickness of the base is less than 23.98 mm.

In an embodiment of the disclosure, at least a portion of the first through hole is gradually expanded along a direction toward the first component, or a diameter of the first through hole is constant along the first axis.

In an embodiment of the disclosure, the first component includes a shielding portion, and a projection of the shielding portion on the base shields a portion of the first through hole.

In an embodiment of the disclosure, the shielding portion is close to the recessed area and is located away from the second component.

In an embodiment of the disclosure, the first component includes a height buffer zone located away from the second component, and the height buffer zone is sloped or stepped.

In an embodiment of the disclosure, the recessed area is a sloped recess or a stepped recess.

In an embodiment of the disclosure, the second through hole extends along a second axis, and the second axis is between the first axis and the second component.

An outer ear module of a recording system of the disclosure includes a base, a first component, and a second component. The base includes a first through hole extending along a first axis, a plate portion and a pipe, the plate portion includes a first surface and a second surface opposite to each other, and the pipe protrudes from the first surface. The first component is disposed on the second surface and includes a second through hole corresponding to the first through hole and a recessed area surrounding the second through hole. The second component is disposed on the first component and is offset from the second through hole. The second component includes an inwardly curved side wall facing the first axis.

In an embodiment of the disclosure, the outer ear module of the recording system further includes a microphone, which is disposed in the pipe, and a distance between the microphone and the second surface is less than 23.98 mm.

In an embodiment of the disclosure, the first through hole includes a first hole portion located in the pipe and a second hole portion penetrating the plate portion. A diameter of the first hole portion is constant along the first axis, and the second hole portion gradually expands in a direction toward the first component.

In an embodiment of the disclosure, the base includes at least one tuning member, which is disposed in the pipe.

Based on the above, in the outer ear structure and outer ear module of the recording system of the disclosure, the first through hole of the base is similar to an ear canal for sound input. The second through hole of the first component and the recessed area surrounding the second through hole are similar to the concha to collect external sounds. The second component is disposed on the first component and is offset from the second through hole. The area of the second component is smaller than the area of the first component, which can prevent excessive reflection of sound waves caused by the second component from affecting the audio reception curve. The inwardly curved side wall of the second component is similar to the auricle, collecting sound waves transmitted from the front, and blocking the direct incoming sound waves from specific directions. Therefore, through the above configuration, the outer ear structure and the outer ear module of the recording system of the disclosure can provide acoustic characteristics close to those of the human ear in a simplified structure.

DETAILED DESCRIPTION OF DISCLOSED EMBODIMENTS

Figure 1A:
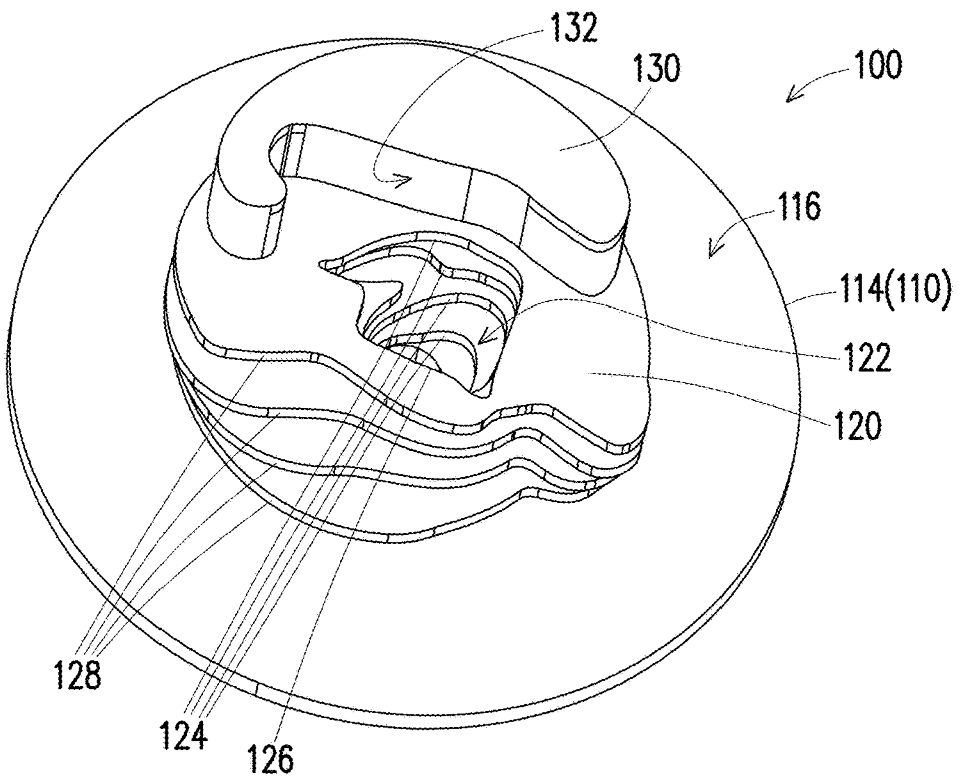
FIG. 1A to FIG. 1C are schematic diagrams of an outer ear module of a recording system viewed from above the second surface from different angles according to an embodiment of the disclosure.
Figure 1B:
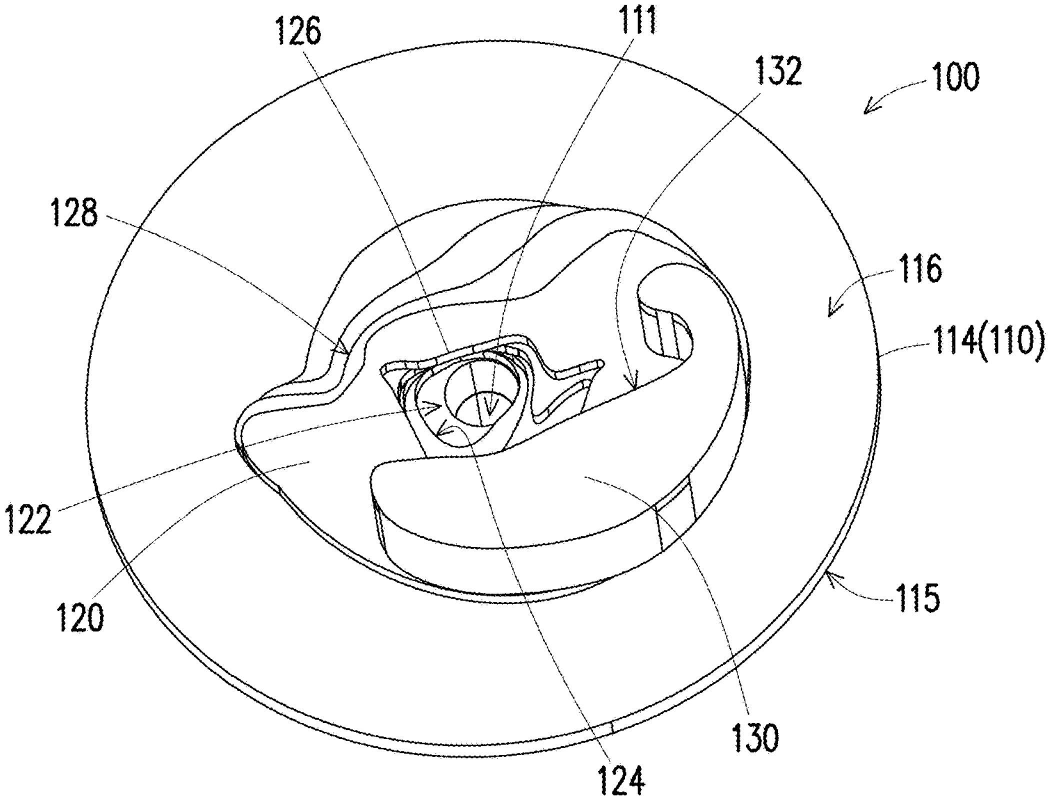
Figure 1C:
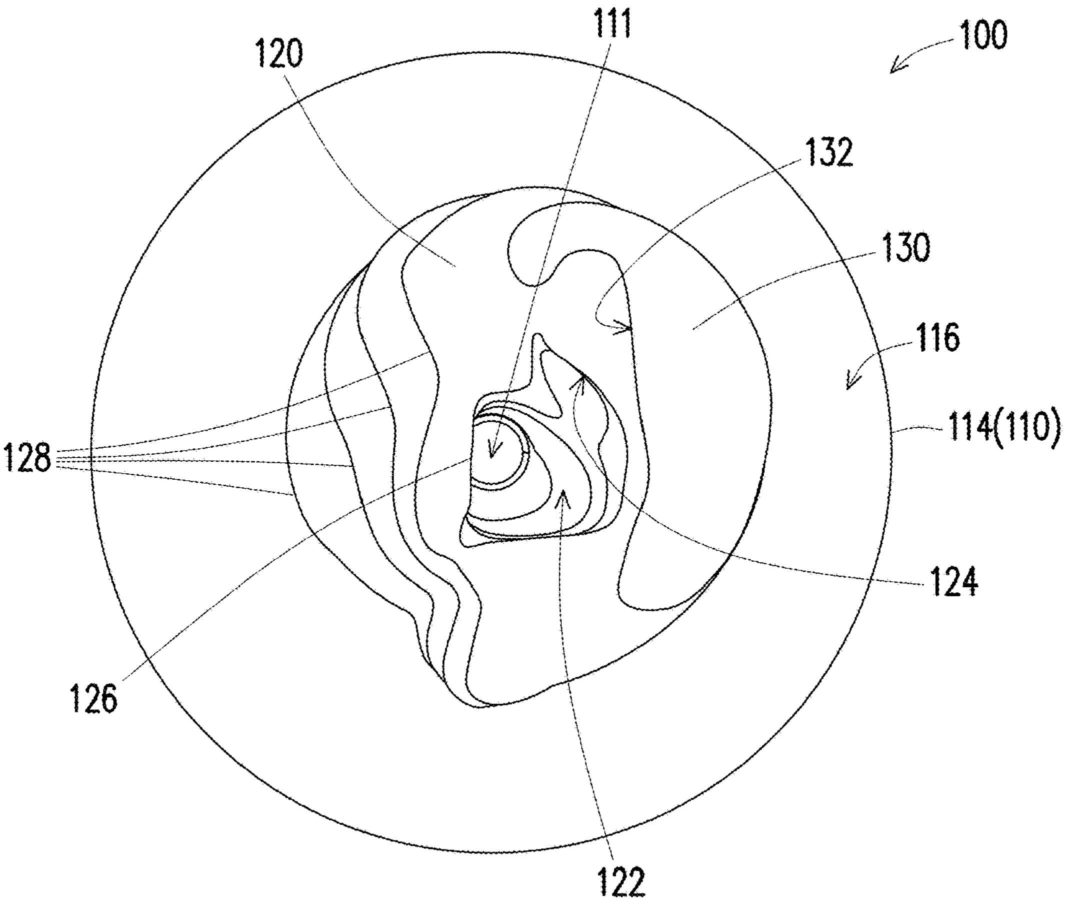
Figure 2:
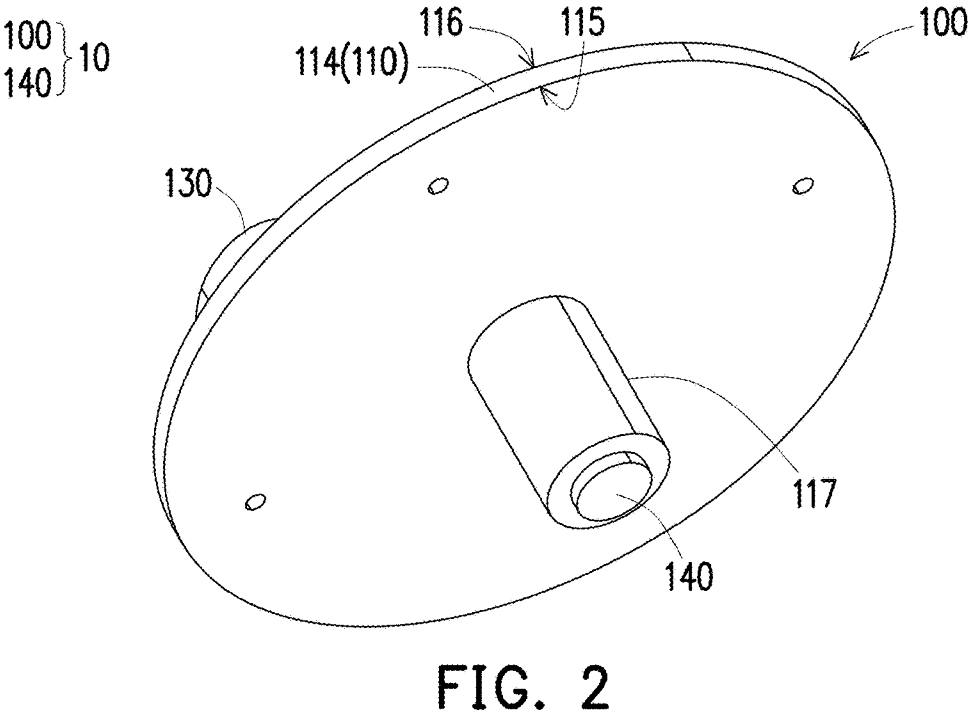
FIG. 2 is a three-dimensional schematic diagram of the outer ear module of the recording system in FIG. 1 viewed facing the first surface.
Figure 3A:
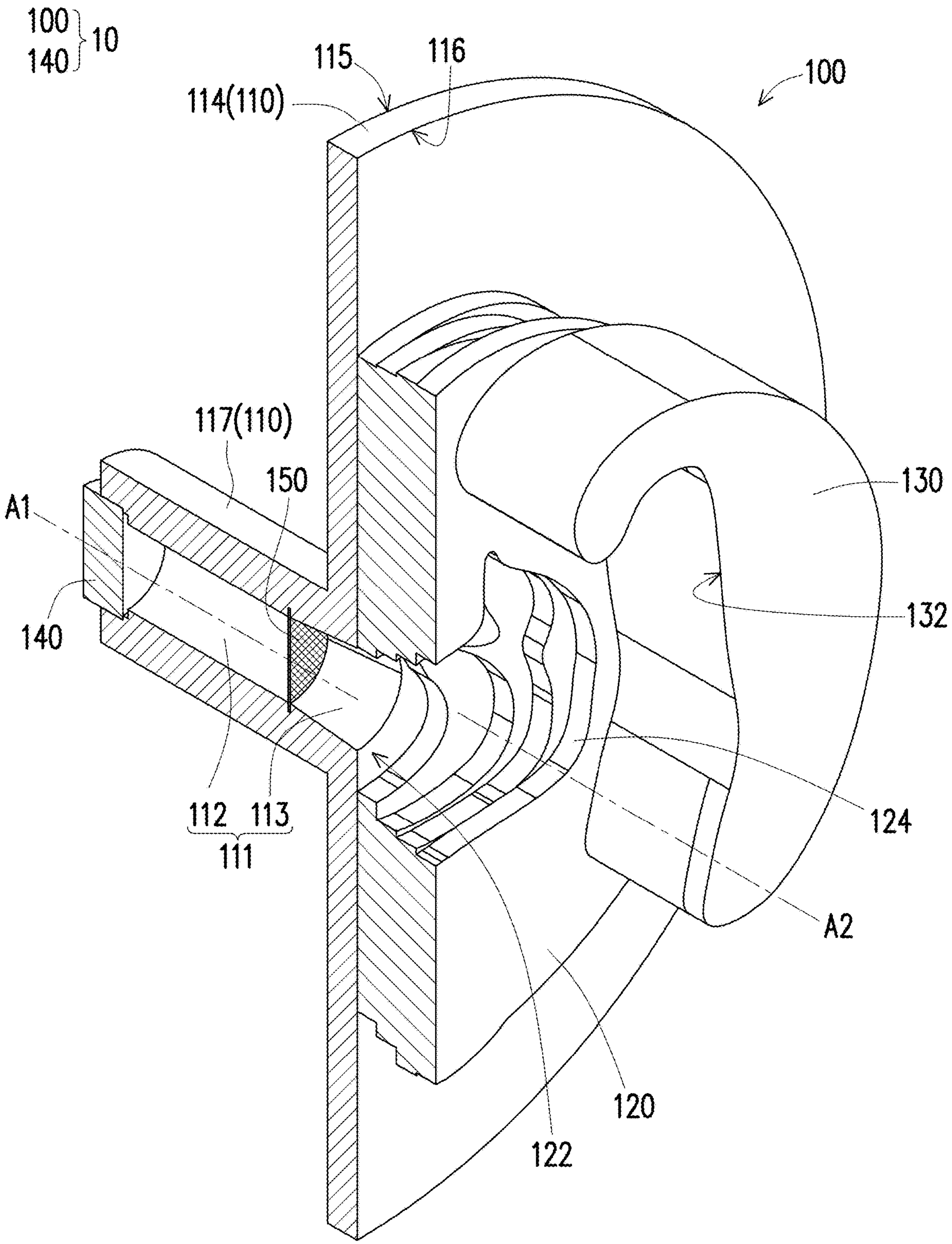
FIG. 3A and FIG. 3B are cross-sectional schematic diagrams of the outer ear module of the recording system in FIG. 1 from different perspectives.
Figure 3B:
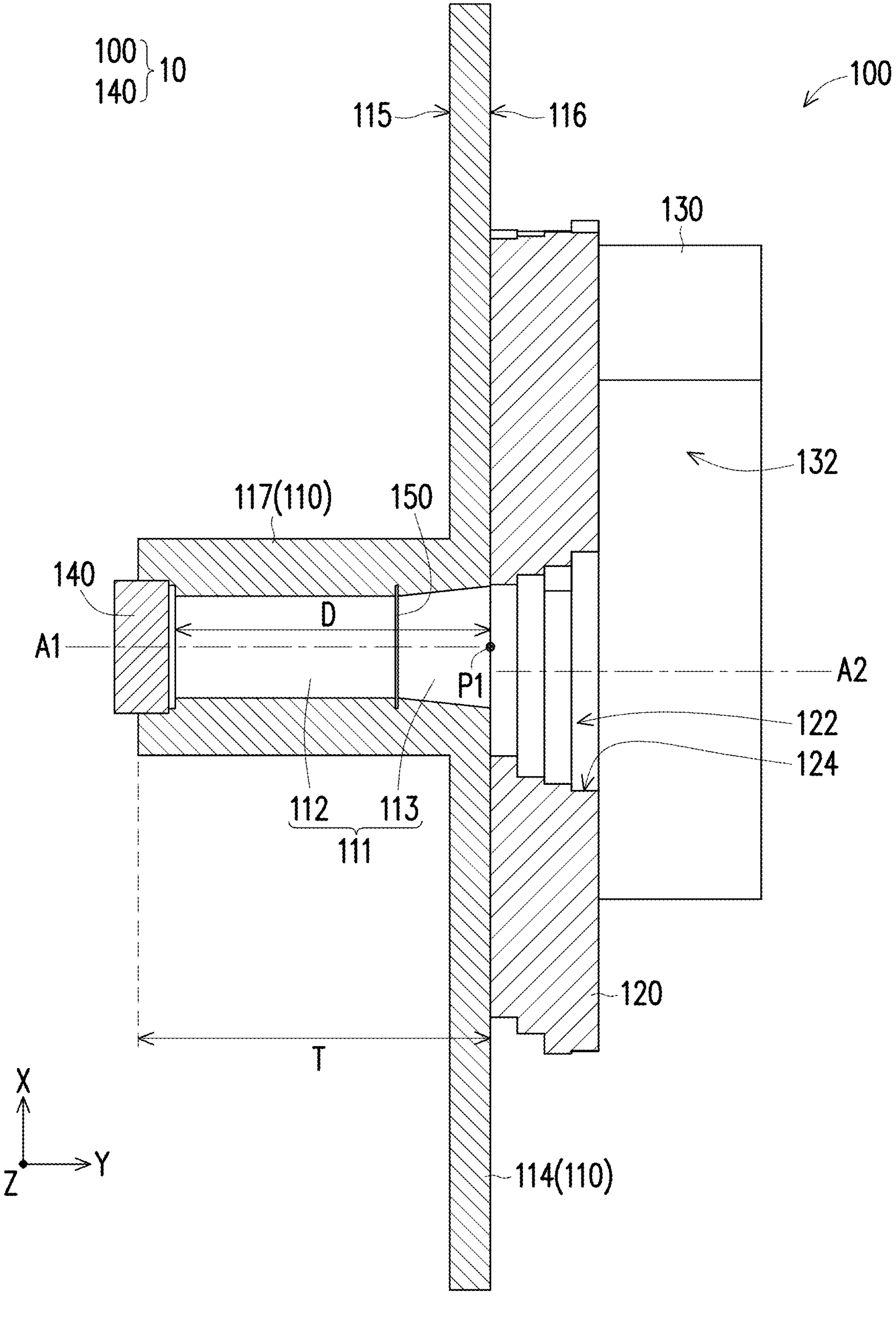

FIG. 1A to FIG. 1C are schematic diagrams of an outer ear module of a recording system viewed from above the second surface from different angles according to an embodiment of the disclosure. FIG. 2 is a three-dimensional schematic diagram of the outer ear module of the recording system in FIG. 1 viewed facing the first surface. FIG. 3A and FIG. 3B are cross-sectional schematic diagrams of the outer ear module of the recording system in FIG. 1 from different perspectives.

Referring to FIG. 1A to FIG. 3B, the outer ear module 10 of the recording system in this embodiment (FIG. 2) includes an outer ear structure 100 of the recording system and a microphone 140 (FIG. 2). The outer ear structure 100 includes a base 110, a first component 120 and a second component 130, forming a structure similar to the outer ear. External sound may be transmitted toward the base 110 through the second component 130 and the first component 120.

As shown in FIG. 3B, in this embodiment, the base 110 includes a first through hole 111 extending along a first axis A1, a plate portion 114 and a pipe 117. The plate portion 114 includes a first surface 115 and a second surface 116 opposite to each other. The pipe 117 protrudes from the first surface 115. The pipe 117 and the plate portion 114 may be an integral structure, or may be two separately manufactured pieces assembled together.

As shown in FIG. 2, in this embodiment, the plate portion 114 of the base 110 is, for example, a circle. However, in other embodiments, the plate portion 114 of the base 110 can also be an oval, a square, or a shape have other irregular contours to serve as a reflective surface similar to the human body to achieve the function of collecting sound waves. The base 110 can be assembled to a simple torso (not shown) or a simulated human head (not shown) to simulate an audio reception state of a real person.

Returning to FIG. 3B, the first through hole 111 is similar to an ear canal for sound input. The cross-sectional shape of the first through hole 111 may be circular, elliptical or other irregular contours. As shown in FIG. 3B, in this embodiment, at least a portion of the first through hole 111 gradually expands in the direction toward the first component 120.

Specifically, the first through hole 111 includes a first hole portion 112 located in the pipe 117 and a second hole portion 113 penetrating the plate portion 114. The diameter of the first hole portion 112 is substantially or at least partially constant along the first axis A1, and the second hole portion 113 gradually expands in the direction toward the first component 120. The gradually expanding design can be equivalent to the outer ear canal effect of the human ear and can provide better acoustic effects.

Of course, in one embodiment, the entire first through hole 111 may have a constant diameter along the first axis A1, or may have a gradually expanding diameter along the first axis A1, which is not limited by the drawings.

Generally speaking, the straight-line distance from the ear canal entrance point (EEP) to the ear-drum reference point (DRP) is about 23.98 mm. In this embodiment, the ear canal entrance point P1 is located at the junction of the base 110 and the first component 120, that is, on the second surface 116. The thickness T of the base 110 affects the simulated ear canal length from the ear canal entrance point to the ear-drum reference point, therefore in this embodiment, the thickness T of the base 110 is less than 23.98 mm to avoid forming an excessively long simulated ear canal.

In addition, in this embodiment, the microphone 140 (FIG. 3B) is disposed on the tube 117 at a recommended position close to the ear-drum reference point to approximate audio reception by the human ear. That is, the distance D between the microphone 140 and the second surface 116 is less than 23.98 mm. In this embodiment, the above configuration can satisfy the resonance frequency of the ear canal, thereby equating to the audio reception curve of the human ear.

Therefore, external sound can be captured by the microphone 140, traveling from the second component 130, through the first component 120, and the base 110, so as to receive sounds with acoustic characteristics (frequency response, FR) that are close to real human ears.

In addition, the base 110 includes at least one tuning member 150, which is disposed in the pipe 117 to adjust the acoustic gain near the resonance frequency to reduce the resonance sensitivity effect, thereby equating to the audio reception curve of the human ear, so that the characteristics are closer to the real ear canal. In this embodiment, the tuning member 150 is, for example, a mesh structure, and the tuning member 150 is disposed at the junction of the pipe where the diameter is constant and the diameter is expanded. However, the type, quantity, and arrangement position of the tuning member 150 is not limited thereto.

As shown in FIGS. 1A and 1B, the first component 120 is disposed on the second surface 116 of the plate portion 114 and includes a second through hole 122 corresponding to and connected to the first through hole 111 and a recessed area 124 surrounding the second through hole 122. In this embodiment, the recessed area 124 can be formed by stacking multiple planar structures. In other embodiments, the recessed area 124 can also be composed of an inclined surface or a curved surface to reduce the impact on high frequencies (above 7 KHz). The recessed area 124 is a sloped or stepped recess, similar to the concha of the human ear, and is used to collect external sound.

In addition, the first component 120 includes a shielding portion 126, which is close to the recessed area 124 and located away from the second component 130, and a projection of the shielding portion 126 on the base 110 shields a portion of the first through hole 111. The shielding portion 126 is similar to the tragus of the human ear, and is used to block sound waves from a specific direction from directly entering the first through hole 111.

In addition, the first component 120 includes a height buffer zone 128 located away from the second component 130. The height buffer zone 128 is sloped or stepped, so that the first component 120 and the base 110 are connected with a gentler slope or step structure, to prevent the sound waves transmitted in the Z axis (FIG. 3B) direction from directly hitting the side wall of the main body, and to provide front sound waves with appropriate angle reflection and diffraction.

The second component 130 is disposed on the first component 120 and is offset from the second through hole 122. The area of the second component 130 is smaller than the area of the first component 120. This design can prevent excessive reflection of sound waves caused by the second component 130 from affecting the audio reception curve. However, the relative position of the second component 130 is not limited, and the second component 130 may also partially exceed the first component 120.

The second component 130 includes an inwardly curved side wall 132 facing the first axis A1. The inwardly curved sidewall 132 is similar to the auricle and is used to collect sound waves transmitted from the front, to reflect the sound waves in the direction of the second through hole 122, and to block direct incoming sound waves from a specific direction.

As shown in FIG. 3A, in this embodiment, the second through hole 122 extends along a second axis A2, and the second axis A2 is between the first axis A1 and the second component 130, so that the recessed area 124 has sufficient area for sound wave reflection.

Figure 4:
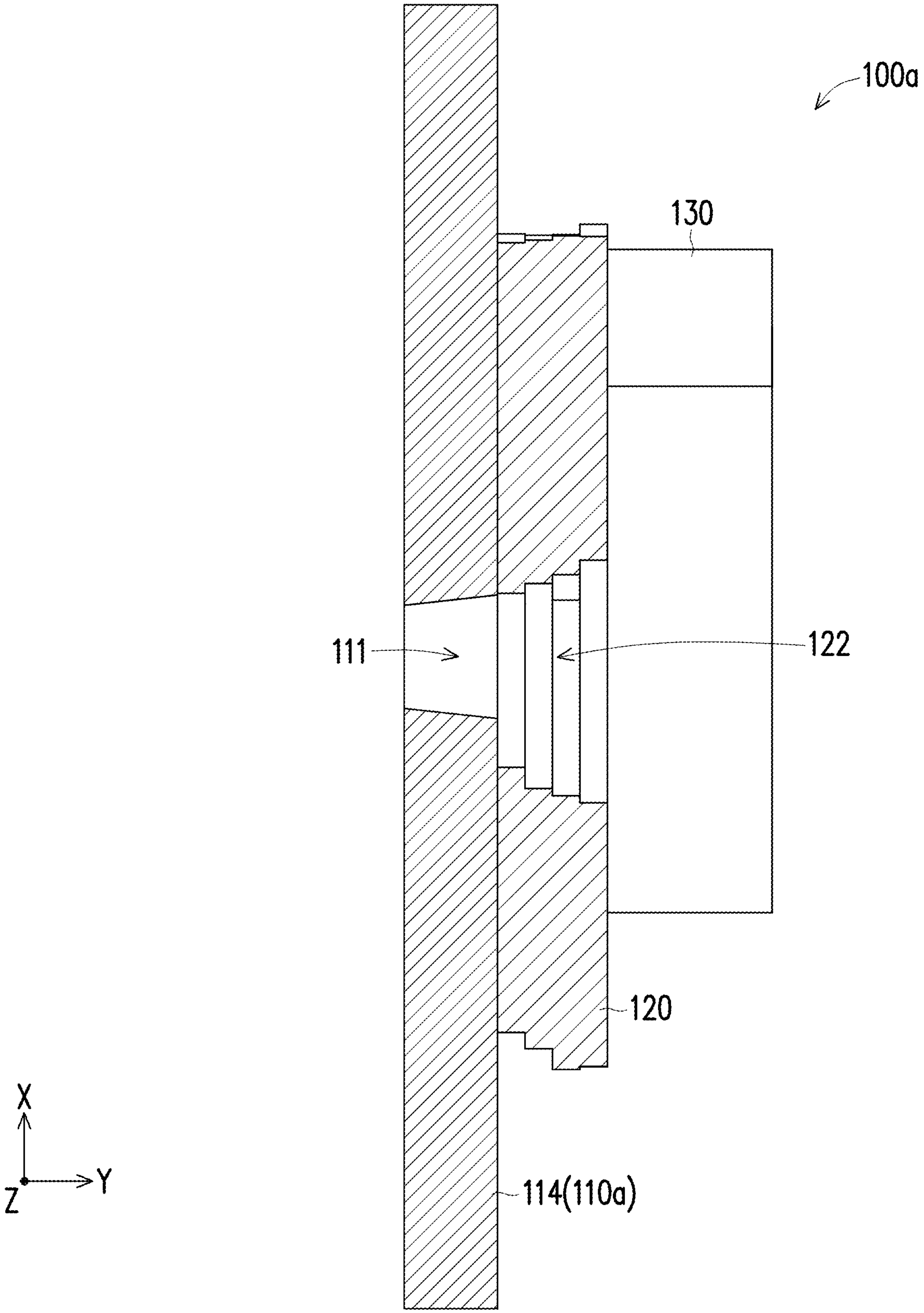
FIG. 4 is a cross-sectional schematic diagram of the outer ear structure of the recording system according to another embodiment of the disclosure.

FIG. 4 is a cross-sectional schematic diagram of the outer ear structure of the recording system according to another embodiment of the disclosure. Referring to FIG. 4, the main difference between the outer ear structure 100*a* of the recording system in this embodiment and the outer ear structure 100 of the recording system in FIG. 3B is that the base 110*a* of the outer ear structure 100*a* of the recording system of this embodiment only includes the plate portion 114 without the configuration of the pipe 117 (FIG. 3B). The outer ear structure 100*a* of the recording system of this embodiment can be disposed on a simple torso or simulated human head with an ear canal simulator or other microphone devices with similar acoustic functions, so that the structure of the outer ear structure 100*a* of the recording system can be simpler and have good acoustic performance.

It is worth mentioning that the following simulations of the left ear conditions are conducted using five states: solely with the microphone 140 for recording; with a simple torso paired with base 110*a*; with a simple torso paired with base 110*a* and the first component 120; with a simple torso paired with the outer ear structure 100*a* (including base 110*a*, the first component 120, and the second component 130) of the recording system; and with a template (ideal outer ear structure) to obtain the DRP sound pressure level curve graph in which the sound source is 0 degrees from the +Z axis and the sound source is 90 degrees from the +Y axis.

Figure 5A:
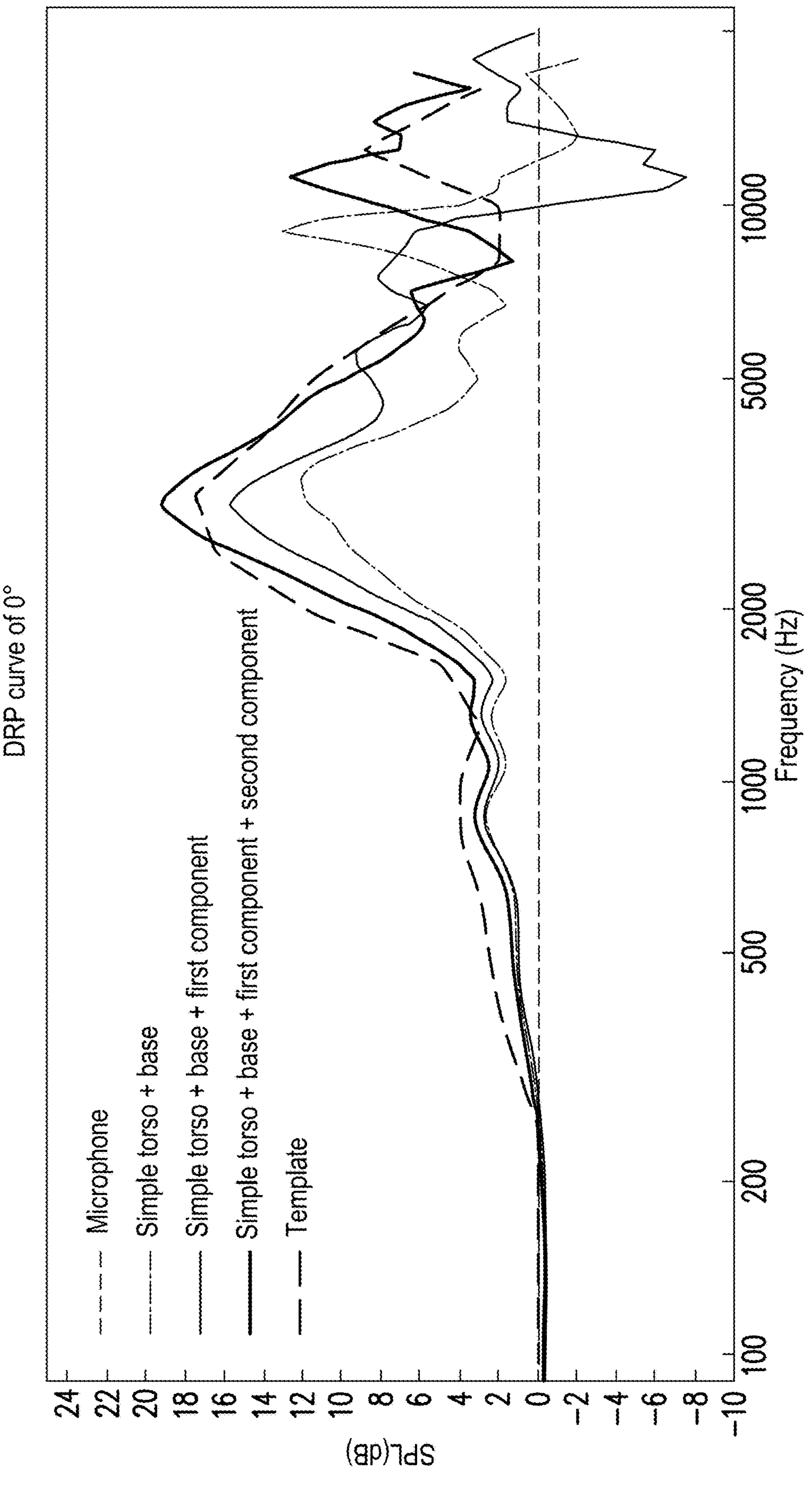
FIG. 5A is a graph of a DRP sound pressure level curve of different components when the sound source is emitted from 0 degrees.
Figure 5B:
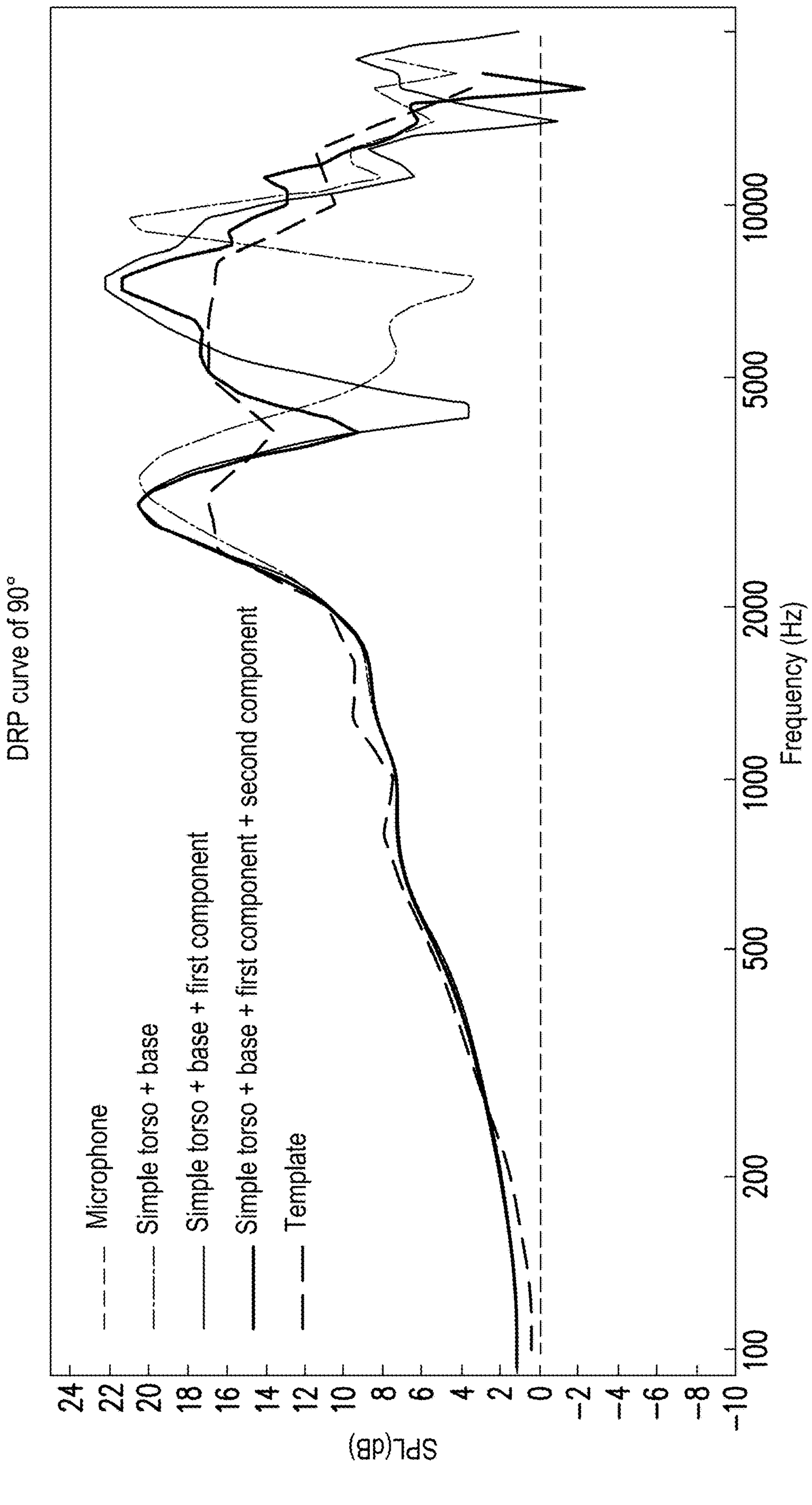
FIG. 5B is a graph of a DRP sound pressure level curve of different components when the sound source is emitted from 90 degrees.

FIG. 5A is a graph of a DRP sound pressure level curve of different components when the sound source is emitted from 0 degrees. FIG. 5B is a graph of a DRP sound pressure level curve of different components when the sound source is emitted from 90 degrees.

Referring to FIG. 5A first, in the simulation where the sound source is emitted from 0 degrees, the setting of the simple torso paired with the base 110*a* forms the main curve characteristic, which affects the frequency band from 200 Hz to 10 KHz. The setting of the simple torso paired with the base 110*a* and the first component 120 further increases the sound pressure from 2 KHz to 7 KHz. The simple torso paired with the outer ear structure 100*a* (base 110*a*, first component 120 and second component 130) of the recording system not only increases the sound pressure from 2 KHz to 7 KHz, but also improves the peak characteristics from 7 KHz to 18 KHz.

Referring to FIG. 5B, in the simulation where the sound source is emitted from 90 degrees, the setting of the simple torso paired with the base 110*a* affects the frequency band from 100 Hz to 20 KHz, but the peak frequency after 5 KHz is much different from the template curve. The setting of the simple torso paired with the base 110*a* and the first component 120 mainly improves the peak frequency after 5 KHz. The simple torso paired with the outer ear structure 100*a* (base 110*a*, first component 120 and second component 130) of the recording system mainly improves the valley sound pressure between 3 KHz and 5 KHz.

Therefore, the outer ear structures 100 and 100*a* of the recording system can significantly simplify the outer ear structure beyond the ear canal entrance point P1 by means of the configuration of the base 110 and 110*a*, the first component 120, and the second component 130, while substantially preserving the acoustic characteristics conditions of the ear-drum reference point. In addition to reducing the difficulty and cost of manufacturing, the measured DRP sound pressure level curves from different angles can be similar to the DRP sound pressure level curves of the actual outer ear structure, thereby achieving good acoustic performance.

To sum up, in the outer ear structure and outer ear module of the recording system of the disclosure, the first through hole of the base is similar to an ear canal for sound input. The second through hole of the first component and the recessed area surrounding the second through hole are similar to the concha to collect external sounds. The second component is disposed on the first component and is offset from the second through hole. The area of the second component is smaller than the area of the first component, which can prevent excessive reflection of sound waves caused by the second component from affecting the audio reception curve. The inwardly curved side wall of the second component is similar to the auricle, collecting sound waves transmitted from the front, and blocking the direct incoming sound waves from specific directions. Therefore, through the above configuration, the outer ear structure and the outer ear module of the recording system of the disclosure can provide acoustic characteristics close to those of the human ear in a simplified structure.

What is claimed is:

1. An outer ear structure of a recording system, comprising:

a base, comprising a first through hole extending along a first axis;

a first component, disposed on the base and comprising a second through hole corresponding to the first through hole and a recessed area surrounding the second through hole; and a second component, disposed on the first component and offset from the second through hole, wherein an area of the second component is smaller than an area of the first component, the second component comprises an inwardly curved side wall facing the first axis, wherein the inwardly curved side wall is located at a side of the second component away from the first component.

2. The outer ear structure of the recording system according to claim 1, wherein a thickness of the base is less than 23.98 mm.

3. The outer ear structure of the recording system according to claim 1, wherein at least a portion of the first through hole is gradually expanded along a direction toward the first component, or a diameter of the first through hole is constant along the first axis.

4. The outer ear structure of the recording system according to claim 1, wherein the first component comprises a shielding portion, and a projection of the shielding portion on the base shields a portion of the first through hole.

5. The outer ear structure of the recording system according to claim 4, wherein the shielding portion is close to the recessed area and is located away from the second component.

6. The outer ear structure of the recording system according to claim 1, wherein the first component comprises a height buffer zone located away from the second component, and the height buffer zone is sloped or stepped.

7. The outer ear structure of the recording system according to claim 1, wherein the recessed area is a sloped recess or a stepped recess.

8. The outer ear structure of the recording system according to claim 1, wherein the second through hole extends along a second axis, and the second axis is between the first axis and the second component.

9. An outer ear module of a recording system, comprising:

a base, comprising a first through hole extending along a first axis, a plate portion, and a pipe, wherein the plate portion comprises a first surface and a second surface opposite to each other, and the pipe protrudes from the first surface;

a first component, disposed on the second surface and comprising a second through hole corresponding to the first through hole and a recessed area surrounding the second through hole; and a second component, disposed on the first component and offset from the second through hole, wherein the second component comprises an inwardly curved side wall facing the first axis.

10. The outer ear module of the recording system according to claim 9, further comprising a microphone, disposed in the pipe, wherein a distance between the microphone and the second surface is less than 23.98 mm.

11. The outer ear module of the recording system according to claim 9, wherein the first through hole comprises a first hole portion located in the pipe and a second hole portion penetrating the plate portion, a diameter of the first hole portion is constant along the first axis, and the second hole portion gradually expands in a direction toward the first component.

12. The outer ear module of the recording system according to claim 9, wherein the base comprises at least one tuning member disposed in the pipe.

* * * * *